(12) United States Patent
Quon et al.

(10) Patent No.: US 10,078,872 B2
(45) Date of Patent: Sep. 18, 2018

(54) SYSTEM AND METHOD FOR MANAGING AND PROCESSING CHANNEL LINES IN A COMMUNICATION NETWORK

(71) Applicant: CONNECTED DISPLAYS INC., Vancouver (CA)

(72) Inventors: Nelly Kim Linh Quon, Vancouver (CA); Colin Shong Chin Quon, Vancouver (CA)

(73) Assignee: CHATNELS SOFTWARE INC., Vancouver (CA)

( * ) Notice: Subject to any disclaimer, the term of this patent is extended or adjusted under 35 U.S.C. 154(b) by 241 days.

(21) Appl. No.: 15/063,320

(22) Filed: Mar. 7, 2016

(65) Prior Publication Data

US 2016/0284031 A1    Sep. 29, 2016

Related U.S. Application Data

(60) Provisional application No. 62/138,867, filed on Mar. 26, 2015.

(51) Int. Cl.
| | |
|---|---|
| *G06F 15/16* | (2006.01) |
| *G06Q 50/00* | (2012.01) |
| *H04L 29/06* | (2006.01) |
| *G06Q 30/00* | (2012.01) |
| *H04W 4/21* | (2018.01) |
| *H04W 4/08* | (2009.01) |
| *H04L 12/58* | (2006.01) |

(52) U.S. Cl.
CPC ............ *G06Q 50/01* (2013.01); *G06Q 30/01* (2013.01); *H04L 51/04* (2013.01); *H04L 65/403* (2013.01); *H04W 4/08* (2013.01); *H04W 4/21* (2018.02); *H04L 51/32* (2013.01)

(58) Field of Classification Search
CPC ........ G06Q 50/01; G06Q 30/01; H04L 51/04; H04L 65/403
USPC .................................... 709/206, 223
See application file for complete search history.

(56) References Cited

U.S. PATENT DOCUMENTS

| | | |
|---|---|---|
| 8,738,715 B2 | 5/2014 | Roy et al. |
| 2006/0212518 A1* | 9/2006 | Bailey .................... H04L 51/04 709/205 |

(Continued)

OTHER PUBLICATIONS

Communications Software Finances Online, <https://communications-software.financesonline.com/c/instant-messaging-chat> (dated Oct. 25, 2017).

(Continued)

*Primary Examiner* — Philip B Tran
(74) *Attorney, Agent, or Firm* — Nexus Law Group LLP; Nicholas P. Toth

(57) ABSTRACT

A system is disclosed that provides functionality for users to manage and use chat channels. This system enables admin users of the chat channel to manage channel lines, and options for channel line members to manage chat line presentity status such as hold and resume and apply controls such as transfer and forward or bridge the chat with the PSTN network. The chat channels provide a range of chat communications modes including intercom, inbound, shout-down, open, conference, and direct messaging. The intercom mode provides secure group chat for the channel line members, and the inbound mode allows non channel members to initiate secure group chat with the channel line members.

17 Claims, 7 Drawing Sheets

(56) References Cited

U.S. PATENT DOCUMENTS

| | | | |
|---|---|---|---|
| 2006/0242232 A1* | 10/2006 | Murillo | H04L 12/1813 709/204 |
| 2010/0029312 A1* | 2/2010 | Smith | H04L 51/38 455/466 |
| 2011/0153750 A1* | 6/2011 | Sanchez | H04L 12/1822 709/206 |
| 2013/0198296 A1* | 8/2013 | Roy | G06Q 10/107 709/206 |
| 2014/0310365 A1* | 10/2014 | Sample | H04L 51/16 709/206 |
| 2016/0261647 A1* | 9/2016 | Yerli | H04L 65/1069 |

OTHER PUBLICATIONS

Leggett et al., "Market Overview: Chat Solutions for Customer Service" (2015), Summary only, <https://www.forrester.com/report/Market+Overview+Chat+Solutions+For+Customer+Service/-/E-RES92941>.

* cited by examiner

SYSTEM AND METHOD FOR MANAGING AND PROCESSING CHANNEL LINES IN A COMMUNICATION NETWORK

CROSS-REFERENCE TO RELATED APPLICATIONS

This application claims the benefit of U.S. Provisional Patent Application No. 62/138,867, filed Mar. 26, 2015, the entire disclosure of which is hereby incorporated by reference.

FIELD OF THE DISCLOSURE

The present disclosure relates to the field of messaging systems and methods. In particular, the disclosure relates to persistent chat messaging, voice, and video communications between users and autonomous bots, and methods having chat lines useful in customer-to-business communications, and business-to-business communications.

DESCRIPTION OF THE BACKGROUND

Most business enterprises rely on communications tools such as telephone and email to communicate with their customers and partners. While the traditional telephone provides real-time interactive communications, it lacks support for rich media interactions compared to chat services such as MSN, Yahoo, and Skype (all trade-marks). It is also challenging for both the caller and the callee to multi-task while on a telephone call, or to extend and resume the dialogue after hanging up the call. On the other hand, it is easy to multi-task and to extend communications using email but email is generally not suited for real-time interactive communications.

Nowadays, many businesses use social media services such as Twitter and Facebook (all trade-marks) to communicate with their customers. However, such services are often very public such as tweeting at a business or commenting on a business's photo, and require the users to use their personal online profiles. These services are generally not designed for more private consumer-to-business interaction flows that are typical of telephony communication. It is also difficult for both the customers and the businesses to organize theirs communications around specific topics such as events or functions such as customer support.

Some businesses have started using mobile or enterprise chat services such as WeChat, Whatsapp, and Slack (all trade-marks). However, consumer-to-consumer chat services typically require the participating parties to be added to each other's contact addressbook or be invited into group conversations. These chat messaging services are generally not suited for extended groups or where the users do not have personal, work, or direct social relationships.

SUMMARY OF THE DISCLOSURE

An embodiment of the present disclosure may be found in chatnels (trade-mark), a service ("Service") that makes it simpler for customers to get updates and connect with businesses using chat channels. Chat channels provide more privacy than social media and enable richer media communications compared to telephone and email. Each channel pulls together the latest postings and social feeds, and provides a simple communications hub in the form of channel lines for customers to interact with the business.

In the preferred embodiment of the Service, the user clients of the Service comprising of mobile clients for smart phones and tablets, and desktop clients interface with the Service application servers as well as network services such as Public Switched Telephone Network (PSTN) voice termination and push notification services. The Service allows user accounts with administrative rights to create a channel and set various channel attributes such as making the channel public or by invitation only, and invite user accounts as members of the channel. Each channel may be associated with a channel wall which allows channel members to post updates and link social feeds. Each channel also provides any number of channel lines for non-channel member user accounts to initiate chat with the channel line member user accounts.

In a first aspect of this present disclosure, a method for controlling channel access via user roles is provided where the administrative user accounts are provided with administrative as well as service access rights. A user account may have the role of administrator, member, subscriber, or viewer of a channel. The administrative user accounts of the channel may manage the channel properties such as setting the channel access privacy to public, unlisted, and members only. Administrative user accounts may also invite or accept any user accounts as members of the channel. Channel members may include a plurality of autonomous bots such as auto-attendants, data feed collectors, etc. Public channels can be searched and accessed by any user accounts. Unlisted channels are accessible only to user accounts with the URL link of the channel. Members-only channels are accessible only to user accounts invited or admitted by the channel administrative user accounts as members of the channel.

The method may further comprise enabling the administrative user accounts of the channel to create any number of channel lines, with the ability to edit channel line properties such as line name, remove channel lines, suspend or reactivate channel lines, split or merge channel lines, and link specific channel lines to services such as the PSTN or an online service such as Slack or Skype (all trade-marks). The administrative user accounts of the channel line may assign any members of the channel as members of the channel line.

The method may further comprise providing the administrative user accounts of a channel line with options to include and manage channel line members that may be autonomous bots having a plurality of functions such as text-to-speech, language translation, audit and compliance monitoring, and bridging the chat conversation content with networks such as social media and the PSTN.

In a second aspect, the method may further comprise providing each channel line with a number of communications modes including intercom, inbound, shout-down, open, conference, and direct. For the intercom communications mode, the channel line provides a persistent group chat amongst user accounts that are members of the channel line. For the inbound communications mode, the method may enable a user account that is not a member of the channel line to initiate a persistent chat sessions as a group chat with all members of the channel line. The method may further comprise providing members of a channel line with the option to block or ban a specific non-member user account from initiating or resuming chat on the channel line.

The method may further comprise providing the participant user accounts of the chat communications associated with the channel line with features to exchange a plurality of communications media including message text, streaming voice, streaming video, media clips, URL links, icons such as smiley, images such as photos, and file attachments. The method may further comprise providing the participant user accounts of the chat communications with option to apply additional access control on specific content within the chat communications, where the ability to recover the original content may only be read once by the recipient chat participant user account or other variations such as can only be read for a configurable duration of time.

The method may further comprise providing the participant user accounts of the chat communications associated with the channel line with option to close the chat as a way to hide the chat from the Inbox. The method may further comprise enabling the participant user account of the chat communications to send a new message or message event into a closed chat to resume the chat communications. The method may further comprise allowing a participant user account of the chat communications to completely remove a closed chat and to delete the entire chat communications history.

In another aspect, the method may further comprise allowing channel line members, upon issuance of a command, to set the presentity of the channel line such as available, out-of-service, busy, offline, and do-not-disturb. The method may further comprise, upon issuance of a command, allowing channel line members to place a chat communications associated with a channel line on hold or to un-hold a chat communications, forward all inbound chat communications to a different channel line, or transfer any chat communications associated with a channel line to a different line.

A server and/or device may be provided to implement any aspects of the method described. In other aspects various combinations of sets and subsets of the above aspects are provided.

BRIEF DESCRIPTION OF THE DRAWINGS

Embodiments of the disclosure will now be described, by way of example only, with reference to the following figures, in which.

DETAILED DESCRIPTION OF THE SPECIFIC EMBODIMENTS

Figure 1:
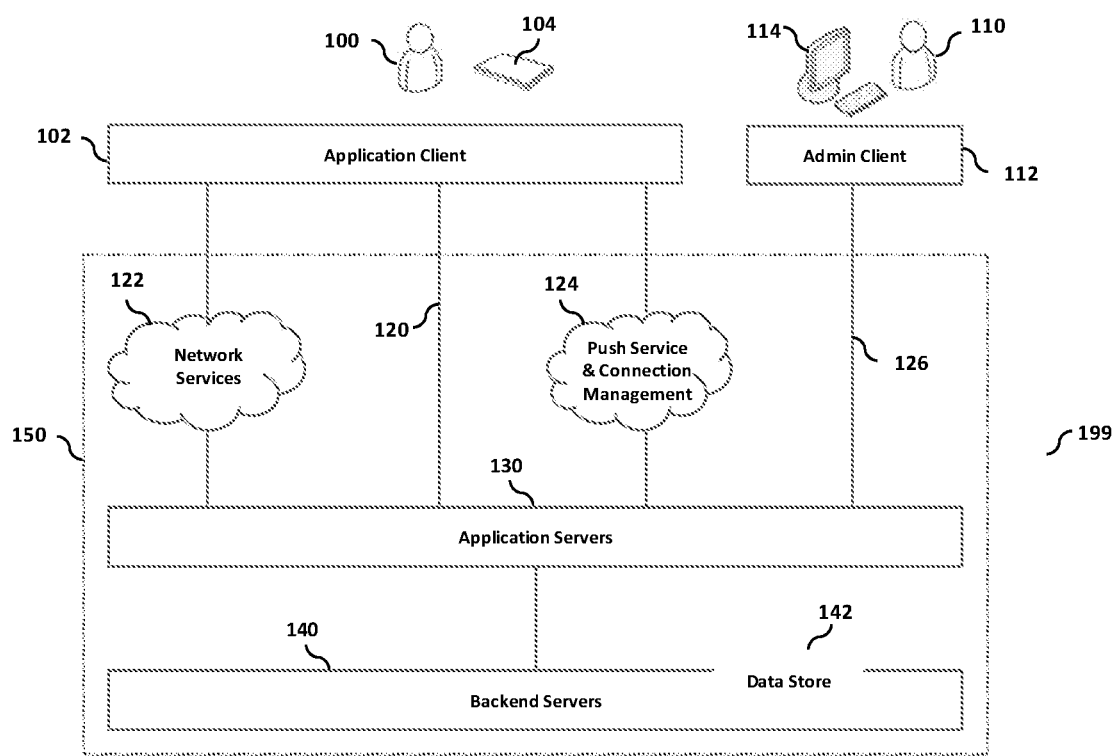
FIG. 1 is an exemplary diagram of the system context of the Service.

Exemplary details of embodiments are provided herein. The description which follows and the embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

Structural components of an embodiment and its features are now described in view of FIG. 1. An embodiment of the disclosed system and services is depicted by system 199 comprising of server side components 150 and client side applications 102 and admin applications 112. Server side 150 consists of application servers 130, other backend servers 140, data stores 142, and subsystems such as chat messaging subsystems, presence servers, telephony call managers and PSTN interconnect gateways. These servers may be physical servers in a data center or hosted on platform-as-a-service providers such as Amazon Web Services and Microsoft Azure (all trade-marks). Application clients 102 may be provided on various application platforms such as Windows, OSX, Linux, iOS, and Android (all trade-marks); and on a variety of computing devices 104 such as PCs, smart phones, and tablets for use by users 100 of the Service. An administrative client application 112 hosted on a variety of devices 114 such as PC, tablet, and smart phone is also provided for administrative users 110 such as enterprise or partner service administrator user accounts to manage the Service. For simplicity, additional service components such as reporting, analytics, billing, monitoring, and development operations are not shown in FIG. 1.

As shown in FIG. 1, the system consists of application clients 102 which connect to the Service via secured IP data connections 120, 122, and 124 where such connections are preferably optimized for bandwidth and battery consumption especially for carrier wireless data networks. For certain media content and network services, the application client may connect directly to third party online services 122 such as Facebook, YouTube, Instagram, and Twitter (all trade-marks), and network services such as Firebase, Twilio, and Verizon (all trade-marks). Further, the application client 102 and application server 130 may implement a push service and connection management interface 124 such as keep-alive heart beat and third party push services such as Apple Push Notification and Android Notification Services (all trade-marks). Interface 120 provides a secure and primary interface for the exchange of application control, management, and content data between the application client 102 and the application servers 130. The admin client application 112 connects to the application servers 130 via a secured interface 126. This interface provides the control and administrative capabilities for partner user accounts and enterprise service administrative user accounts 110.

One embodiment of the system 199 provides a directory service of businesses, members of business associations, or affiliated members or partners of a business. The directory service provides user accounts 100 via the application client 102 with capabilities to search the list of businesses in the directory data store 142 based on certain search criteria or filters, and view the search results. Each of the businesses in the directory may be associated with one or more chat channels of the Service to allow the user accounts 100 that may be customer user accounts to connect with the user accounts that may be associated with businesses listed in the directory, or user accounts that may be associated with business operators to collaborate with other business user accounts listed in the directory. The directory service also provides administrative user accounts 110 with a range of administrative capabilities via the admin client 112 to manage user accounts 100,110 such as to create chat channels for the businesses, manage members associated with each of the chat channels, curate the list of companies in the directory, and edit company profile descriptions.

Another embodiment of the system 199 provides a messaging service. Service entities that enable the messaging service include channel, channel wall, and channel line. A channel may contain a channel wall which pulls together postings and social updates into a feed, and may contain any number of channel lines for chat communications. User account entities that are involved in a chat communications include channel administrator, channel member, channel line member, and non-channel member. Depending on the assigned privileges, the channel administrator user account would typically manage the channel such as invite channel members, create and manage channel lines, and assign channel members as members of channel lines. Non-channel members are user accounts of the service having access to the channel including the channel wall and channel lines but are not members of the channel.

Figure 2:
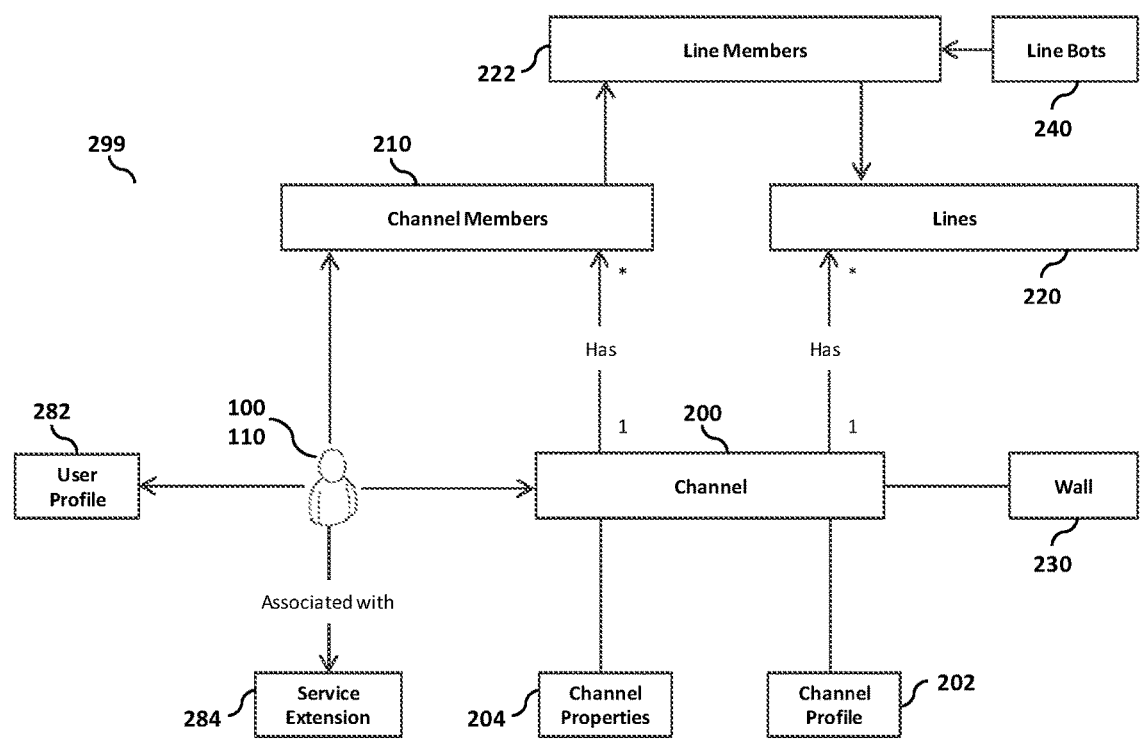
FIG. 2 is an exemplary diagram of the system data model.

An embodiment of the system data model of the Service is illustrated in FIG. 2. As shown in the exemplary data model in FIG. 2, a user account 100 associated with a user profile 282 is preferably assigned a service extension 284 which may be linked or mapped to an actual public telephone network number or an online network alias. This user account 100 with profile 282 may be assigned one or more of the user roles including administrator, member, subscriber, or viewer with certain service access privileges for a specific chat channel 200.

In the role of administrator for channel 200, the admin user accounts 100,110 may be provided with administrative privileges to manage the channel 200 such as adding and deleting the channel or editing the channel's profile 202 which may include the channel name, description, sponsor information, vanity URL, and location address. The administrative user accounts of channel 200 may also be granted privileges to update the channel properties 204 including privacy access settings for the channel such as public, unlisted, members-only, and just-me, as well as to invite and remove channel members 210. The user accounts 100,110 having administrative role for chat channel 200 may add, edit, or remove any number of channel lines 220 associated with the channel 200. The admin user accounts 100,110 may also assign or invite channel members 210 as line members 222 for a specific channel line 220. Further, the admin user accounts 100 may also assign line bots 240 as line members 222 of a channel line 220. A line bot 240 may be a language translator bot, order status and fulfillment bot, an attendant bot that provides auto messages such as "we are busy at the moment but we will get back to you as soon as we can" or disclaimer text such as "all messages will be recorded and archived for quality support purposes".

For user accounts 100 provisioned with the role of channel member 210 for channel 200, the user account may be provided with the access privileges to post updates and link social feeds to the channel wall 230 associated with the channel 200. If channel 200 has its privacy settings set as unlisted or public, user accounts 100 that are not administrators or members of the channel 200 may subscribe to the channel for updates and message notifications. The channel wall 230 associated with channel 200 may allow the channel members 210 to post any number of media widget items including post notes, images, videos, events, polls, lists, and also linked social feeds such as Facebook, Twitter, YouTube, Instagram (all trade-marks), and RSS.

Now, further detail is provided on exemplary relationship between channels, channel members, channel lines, and channel line members, as well as the data flow for chat communications between channel lines, line members, and non-channel members. At a client, graphical user interfaces may be provided to allow a user account to access features of the service. For example, user interfaces are provided for user account to manage and access a channel which contains a channel wall, and a list of channel lines.

Figure 3:
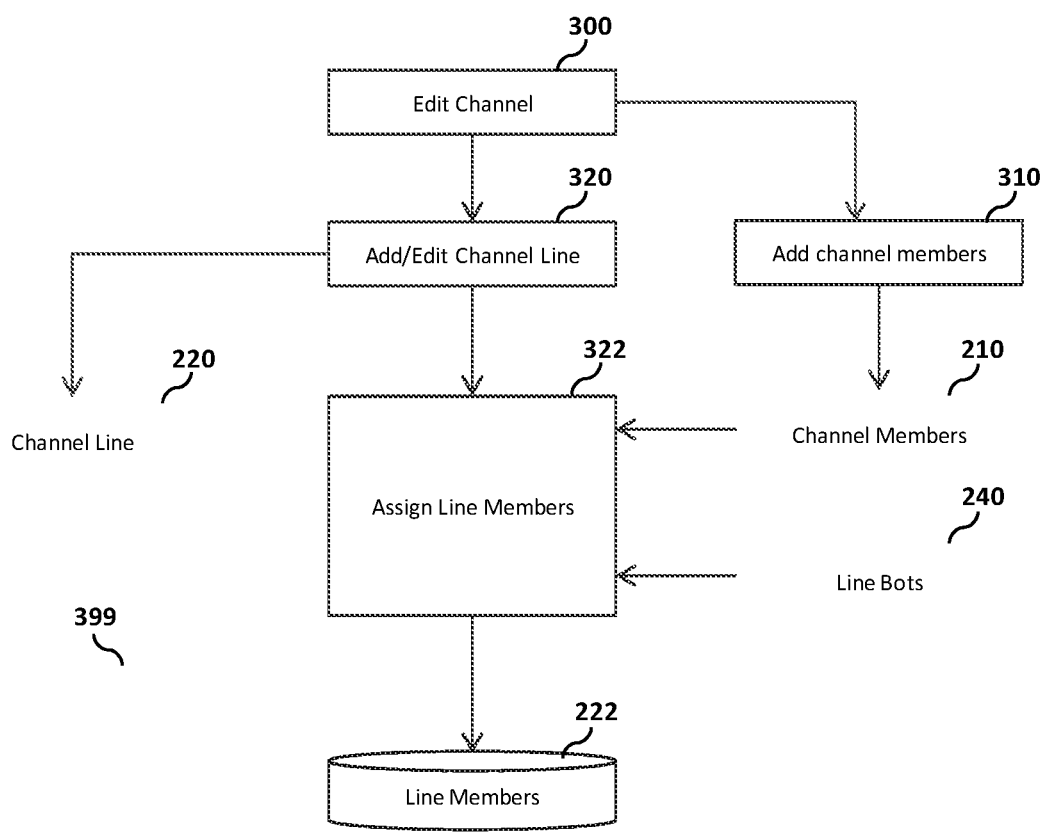
FIG. 3 is an exemplary diagram of channel line management.

In a preferred embodiment, in an exemplary diagram as illustrated in FIG. 3, the user account 100,110 with administrative role may invoke step 300 to edit a channel 200 to change channel preferences, channel membership, and channel lines. The said user account may invoke step 310 to add channel members 210 to the channel 200, invoke step 320 to add or edit channel line 220, and invoke step 322 to assign channel members 210 and line bots 240 as line members 222 of the channel line 220. Step 320 may be used to add any number of channel lines 220 such as "Line 1" and "Line 2", or delete the existing channel lines. The number of channel lines that the admin user account may create or the specific channel lines that the admin user account may manage is controlled by service policies. For a channel line 220, the admin user account may assign any of the channel members 210 as well as line bots 240 as line members 222 of the channel line 220.

Access to a channel 200 is controlled by the channel access privacy of the channel properties 204. For a channel 200 configured with access privacy of members-only, only members 210 of the channel would have access to the channel and hence only channel members 210 would have access to the channel lines 220 associated with the channel 200. For a channel configured with access privacy of public, any user account 100 may search to find the channel to gain access to the channel and associated channel lines. For a channel configured with access privacy of unlisted, only user accounts that know the URL of the channel would have access to the channel and the associated channel lines.

Figure 4:
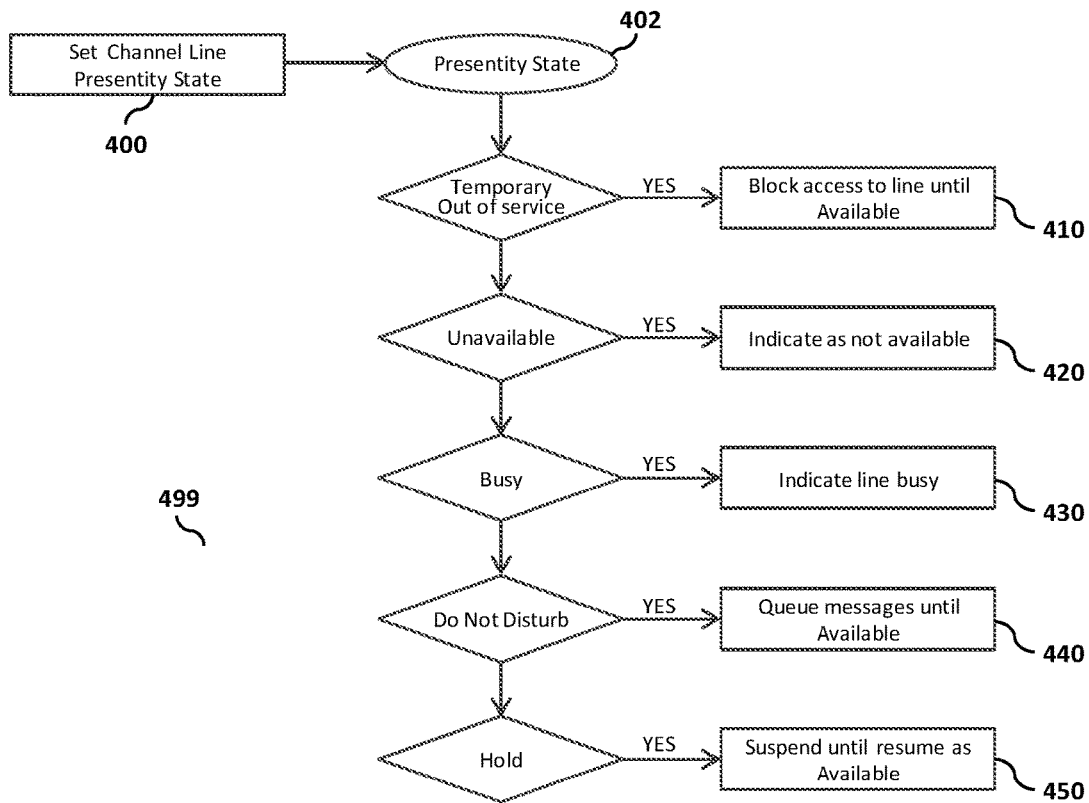
FIG. 4 is an exemplary diagram for channel line presentity and handling disposition.

As illustrated in exemplary diagram FIG. 4, the channel admin user account 100,110 or the channel line members 222 of a channel line 220 may invoke a command 400 to set the channel line presentity state 402 to any status of temporary out of service, unavailable, busy, do not disturb, and hold. Depending on the presentity state of the channel line, the Service may block access 410 to the channel line if the line presentity is set as temporary out of service, indicate line as not available 420 if presentity is set as unavailable, indicate line as busy 430 if presentity is set as busy, queue messages 440 until the line becomes available if the presentity is set as do-not-disturb, and suspend the conversation 450 such as blocking message input into the channel line chat conversation if the presentity is set as hold. For specific presentatity state such as unavailable, the Service may provide a user interface with service status indication such as "We are not available at the moment. Please try again later" or if the presentity state is busy, it may indicate as "We are busy right now. It may take some time for us to respond to you."

Figure 5:
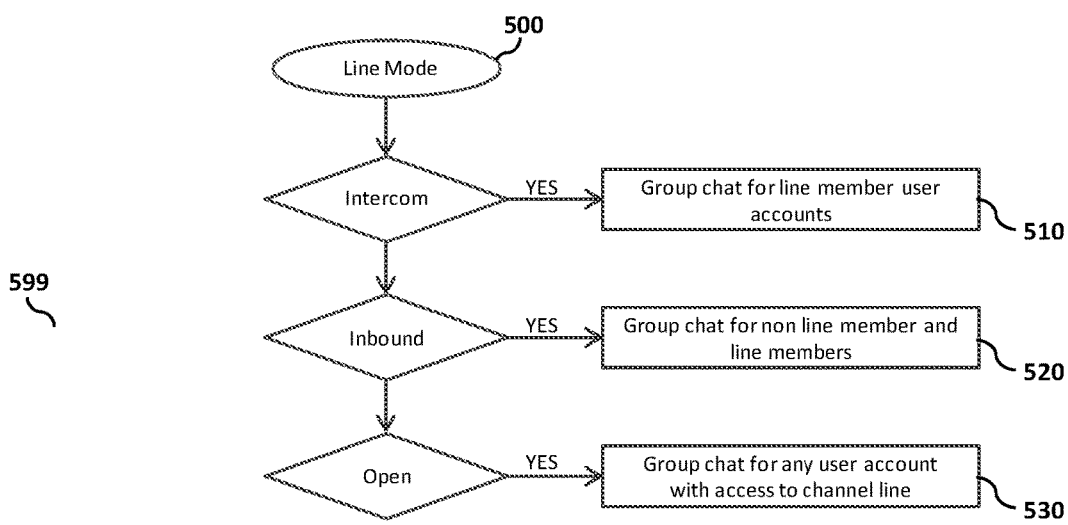
FIG. 5 is an exemplary diagram for channel line communications modes.

One feature of the embodiment provides each channel line with a range of chat communications modes that may be used by the chat participant user accounts on the channel line. As illustrated in exemplary diagram FIG. 5, the channel line communications modes 500 which cause the processing and execution of chat conversations that include:

Intercom 510—which sets up internal group chat for members of the channel line;

Inbound 520—which allows non channel member user accounts to initiate a corresponding number of group chat communications with members of the channel line; and Open 530—which allows non-channel members, channel members, as well as line members to communicate as a chat forum.

Figure 6:
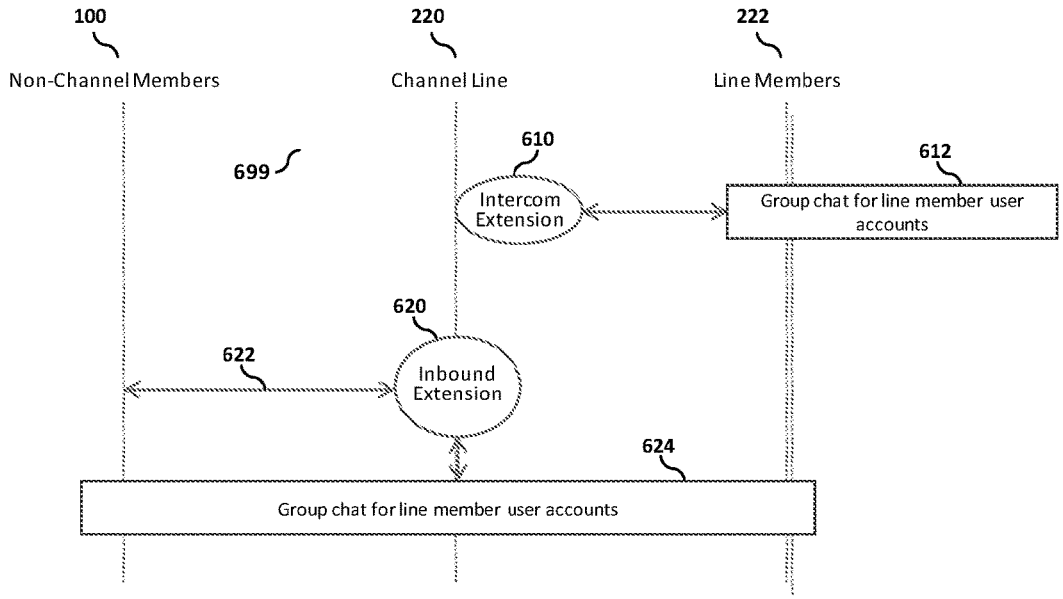
FIG. 6 is an exemplary flow diagram for handling of intercom mode and inbound mode communications.

As exemplary illustration, now further details are provided for the intercom 510 and inbound 520 communications modes of the channel line. In an exemplary diagram as illustrated in FIG. 6, a channel line 220 may be configured with an intercom mode with extension 610 which sets up a secure persistent group chat 612 between participant user accounts that are line members 222 of the channel line 220. The line members 222 for the intercom group may include line bots 240 that may respond to commands from the line members 222 such as to check inventory or to close a customer support ticket. Any channel line member 222 associated with the channel line 220 may become participants of the intercom chat communications.

As shown in FIG. 6, a channel line 220 may be configured to have an inbound chat communications mode with extension 620. When a non-channel member user account 100 accesses the inbound extension 620 of the channel line to initiate a chat communications 622, a secure persistent group chat 624 is setup between the non-channel member user account 100 that initiated that chat and the channel line members 222. For instance, if non-channel member user accounts M and N initiated a chat on the channel line inbound extension 620, the channel line members 222 would be participants in one chat communications with user account M and a second separate chat communications with user account N. The channel line members may access some or all of the inbound mode chats initiated by non channel member user accounts. Each of the inbound mode chat 624 associated with inbound extension 620 may involve line bots 240 that are channel line members 222. The line bots 240 may respond to commands from the chat participant for a range of interaction requests such as language translation, checking inventory, disclaimer text messages, and processing the transactions that were exchanged in the chat communications.

The channel line members 222 that are participants of the chat communications may ban or block non-channel member user accounts from accessing the channel line or continuing the chat communications on the channel line for various reasons such as to control spam. Depending on the assigned privileges associated to the channel line member 222 that are participants of the chat conversation, the participant may be able to invoke additional commands such as sending a blast message to some or all of the chat communications associated with the channel line 220. The channel line members 222 that have specific privileges may also place a channel line on hold, set it as busy, unavailable, out-of-service, and do-not-disturb.

For each intercom chat 400 between channel line members 222, as well as all inbound chats 410 initiated by non-channel member user accounts 100 with the channel line members 222 for channel line 220, the user account's authenticated session is used to establish a secure connection preferably based on HTTPS, TLS, or via direct AES encryption between application client 102 and the application servers 120,122. Using the secured transport connection, the application client 102 may exchange a plurality of chat communications media including text, voice, video, media clips, and file attachments. The media content in the chat communications is saved in the data store 142 and may be further encrypted using a secondary security key controlled by the chat participant user accounts to protect the chat data while at rest. Message events from the chat communications may be sent by the application servers 130 to the push service 124 as notifications to chat communications participant user accounts that are not connected online.

Figure 7:
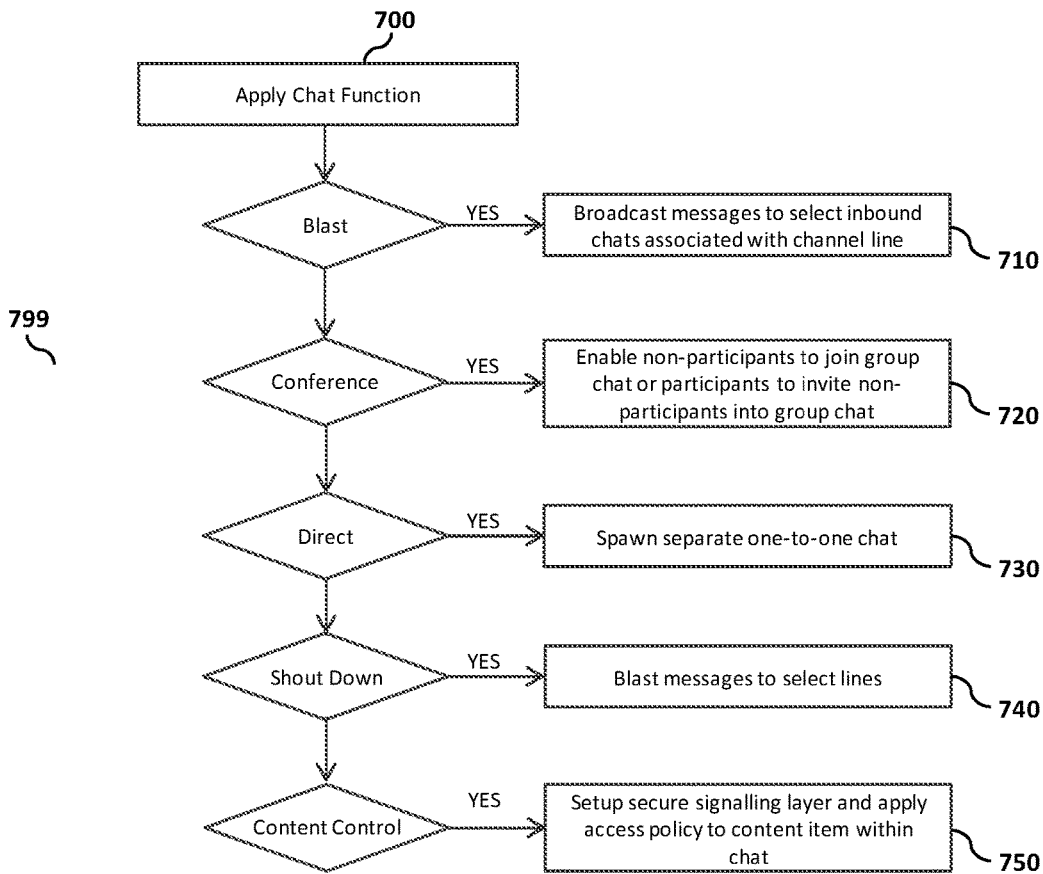
FIG. 7 is an exemplary diagram of communications features on channel lines.

In a preferred embodiment, as illustrated in exemplary diagram FIG. 7, participants in a chat conversation on channel lines 220 associated with a channel 200 may invoke a command 700 to apply chat functions to the chat conversations associated with the channel 200. The chat function command applied may invoke the processing and handling of chat conversation functions that include:

Blast 710—which broadcast a message to all or select inbound chats associated with a channel line;

Conference 720—which allows chat participants to invite any number of non-participants into the group chat communications, or allow non-participants to join the group chat communications;

Direct 730—which allows participants of a chat to spawn a separate direct one-to-one private chat conversation; and Shout-down 740—which allows channel line members to broadcast messages to all or select channel lines associated with the channel.

In one feature of the embodiment as shown in exemplary diagram FIG. 7, the user accounts that are participants of the chat may apply content access controls 750 relating to the exchange of media content within a chat communications. For instance, a chat participant such as a non-channel member user account 100 that initiated the chat may only want to allow the content to be accessible for only a specific duration of time, after which the content becomes inaccessible or not recoverable. Similarly, the chat participant may want a specific content in the chat communications to be accessed just once, or accessible by a specific participant user account of the chat communications. Another example may involve a chat participant user account needing to exchange a secured PIN code with a line bot 240 such as to validate a transaction request without exposing the media content to the other participant user accounts of the chat. A method comprising of a signaling interface between the application clients 102 for chat user account 100, line members 222, and the application servers 130,140 is provided for security key exchange and manage access control to chat communications content subjected to content viewer controls.

The media content for chat communications such as the intercom chat 510 between channel line members 222, and the inbound chats initiated by non-channel member 520 with the channel line members 222 may be stored in a backend data store 142. A search user interface may be provided on application client 102 for the user account 100 to access the chat communications history. Access to the chat communications history may be subject to user account and service control policies. Access to the chat communications content may be subject to further service policies such as retention period or record keeping requirements.

Now, further detail is provided on chat management options between channel lines and media interworking between the channel lines and external network service access points such as the public telephone network.

Figure 8:
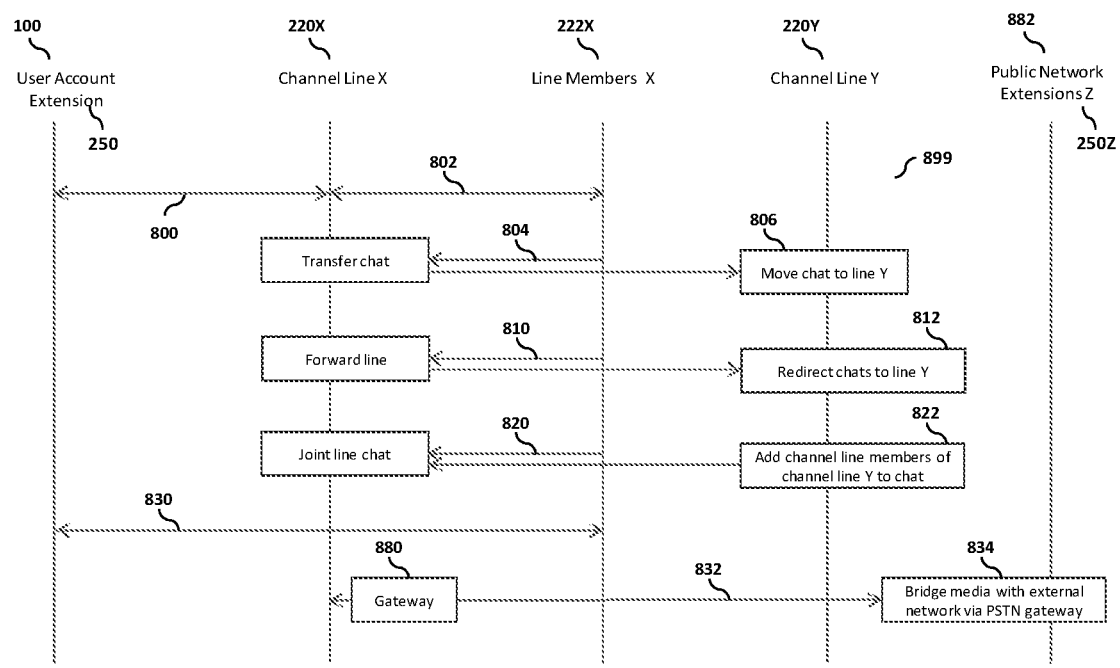
FIG. 8 is an exemplary flow diagram of channel line redirection and media interworking with the external network.

In a preferred embodiment, in an exemplary diagram as illustrated in FIG. 8, a non-channel member user account 100 is associated with a chat communications on channel line 220X with channel line members 222X via the data flow 800,802. A channel line member 222X of channel line 220X who is a participant user account of the chat communications may select to transfer the chat communications to a different channel line 220Y. Upon issuance of the transfer command 804 by a channel line member 222X that is a participant user account of the chat communications, the chat communications would be moved 806 from channel line X to channel line Y where the chat communications may become only accessible to the non-channel member user account 100 and line members of channel line Y but not channel line X.

As another feature of the embodiment, a channel line member 222X of channel line X having administrative rights may select to forward the chats to a different channel line Y. Upon issuance of a command for line forwarding 810, any inbound mode chat initiated by non-channel member user accounts 100 would now be initiated against channel line Y rather than channel line X until a command is issued to remove the line forwarding. As another channel line chat management option, a channel line member 222X that is a participant user account of the chat communications on channel line X may issue command 820 to invite a user account that is not a member of channel line X into the chat communications, or to joint channel line members of another channel line Y into the chat communications on channel line X. Upon issues of the command 820, the channel line members of channel line Y may now be added 822 as participants of the chat that is associated with channel line X.

In a preferred embodiment, in an exemplary diagram as illustrated in FIG. 8, a user account 100 with service extension 250 is associated with a chat communications with channel line members 222X on channel line 220X via the data flows 830. At any time, user account 100 and any of the channel line members 222X that are participants of the chat communications may alter the modality of the communications between messaging, voice, video, etc. In the event the communications modality may involve an external network such as PSTN voice, SMS text, or instant messaging network, signaling and bearer data is sent via interface flow 832 from user account 100 application client 102 with service extension 250 to bridging gateway function 880 consisting of application servers 130 and network services 122 of system 199 of the Service which route the signaling and data flows via interface flow 832 to external network 882 with service end point extensions 250Z. The external network with service end point extension 250Z may be a fixed line telephone, mobile phone, voice/video over IP terminal, or online service accounts such as Google Voice, Facebook Messenger, Yahoo Messenger (all trade-marks), etc. The bridging gateway 880 of system 199 for the Service provides a bridging and interworking function 834 for terminating or connecting the chat communications 830 with the telephone, SMS, or online session with the external network 882 with extension 250Z via interface 832.

Figure 9:
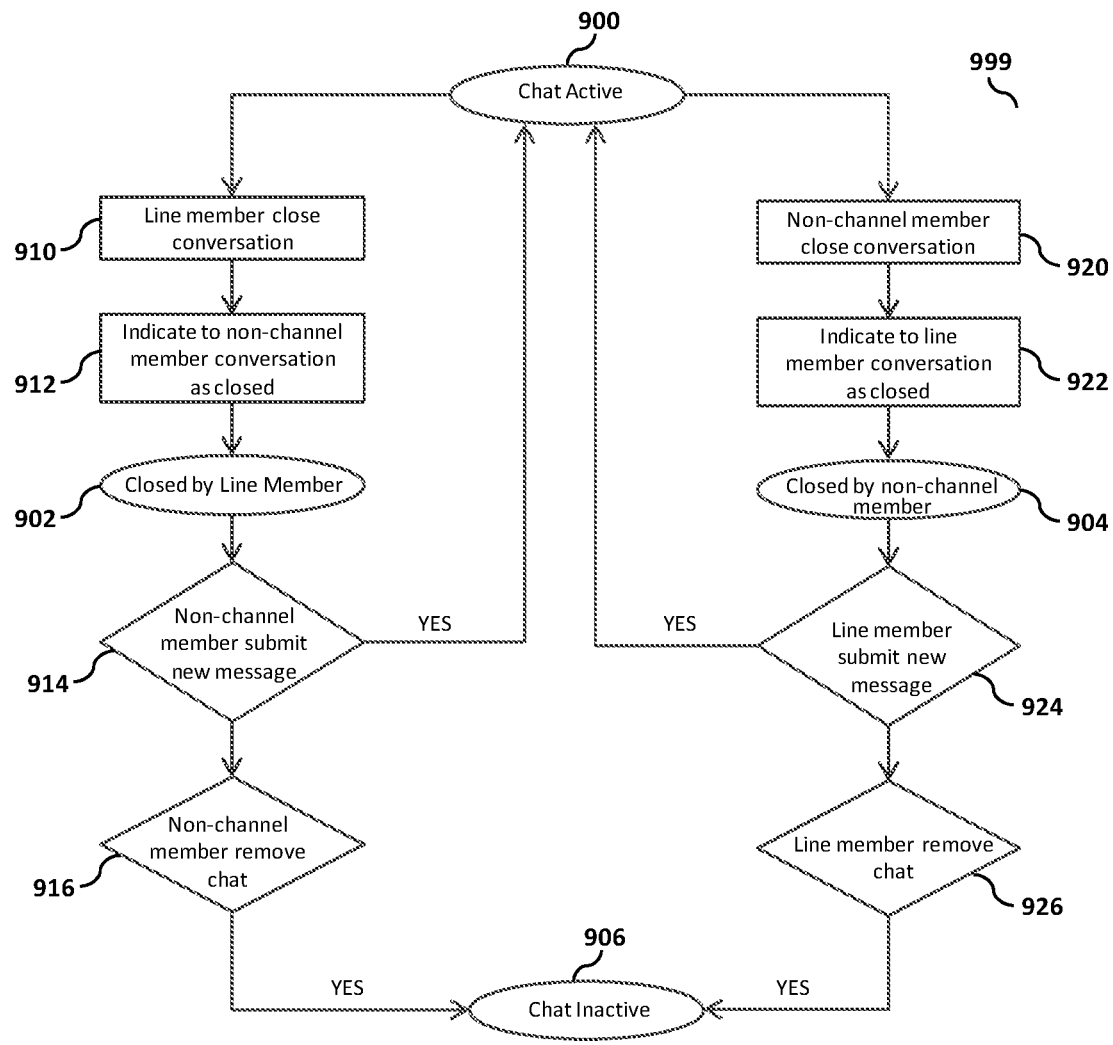
FIG. 9 is an exemplary diagram of closing, resuming, and removing chat communications associated with a channel line.

In a preferred embodiment, in an exemplary diagram as illustrated in FIG. 9, a participant of an inbound mode 520 chat associated with a channel line 220 may invoke a command to close an active conversation to suspend the conversation or to hide the conversation from the user interface such as the Inbox on the application client 102. If the chat participant that issue command 910 to close chat in active state 900 is a line member of the line 220, indication is provided 912 to other participants that a channel line member initiated closing of the conversation, and the chat state is set as "closed by line member" 902. In this chat state, if the non-channel member who is a participant of the conversation submit a new message 914 or select to resume the conversation, the chat state changes back to "active" 900. Instead, if the non-channel member who is a participant of the conversation selects to remove 916 the chat, the chat state changes to inactive 906.

If the chat participant that issue command 920 to close chat in active state 900 is a non channel member of the line 220, indication is provided 922 to other participants that the non-channel member initiated closing of the conversation, and the chat state is set as "closed by non-channel member" 904. In this chat state, if the line member who is a participant of the conversation submit a new message 924 or select to resume the conversation, the chat state changes back to "active" 900. Instead, if the line member who is a participant of the conversation selects to remove 926 the chat, the chat state changes to inactive 906.

The chat conversation data for a conversation with state that is inactive 906 may still be archived and stored in a backend data store 142. Access to the chat communications history may be subject to user account and service control policies. Access to the chat communications content may be subject to further service policies such as retention period or record keeping requirements.

The various features described above may be implemented in, and fully automated by code modules executed by general-purpose computing devices, including but not limited to data center servers, PCs, and mobile phones. The code modules may be stored in any type or types of computer storage device or memory. It should be understood that the various steps may alternatively be implemented in-whole or in-part within specially designed hardware.

It will be appreciated that all modules described herein for client 102, server 130,140 and other modules in the embodiments can be implemented using known programming techniques, languages and algorithms. Although the modules described are implemented in client 102 and server 130,140, 142, it will be appreciated that some functions of the modules may be provided in a separate server that is in communication with clients 102 and/or server 130,140,142. The titles of the modules are provided as a convenience to provide labels and assign functions to certain modules. It is not required that each module perform only its functions as described above. As such, specific functionalities for each application may be moved between modules or separated into different modules. Modules may be contained within other modules. Different signaling techniques may be used to communicate information between applications using known programming techniques. Known data storage, access and update algorithms allow data to be shared between applications. It will further be appreciated that other applications and systems on client 102 may be executing concurrently with other modules. As such, any of modules (or parts thereof) may be structured to operate in as a "background" application on client 102 and server 130,140, 142 respectively, using programming techniques known in the art.

It will be appreciated that the embodiments relating to clients, servers, services, state machines and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

As used herein, the wording "and/or" is intended to represent an inclusive-or. That is, "X and/or Y" is intended to mean X or Y or both.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the claims.

The invention claimed is:

1. A method of processing chat communications associated with a messaging system connected to a network, the method comprising:
   (a) in response to user input received from an administrative client, creating a chat channel having associated therewith one or more channel member accounts and a channel line having associated therewith one or more channel line member accounts selected from the one or more channel member accounts, such that a non-member application client not associated with the one or more channel member accounts is permitted to initiate a chat session associated with the one or more channel line member accounts;
   (b) receiving, from the non-member application client via the network, a first chat communication addressed to the chat channel line so as to initiate the chat session, the first chat communication being accessible to one or more member application clients associated with the one or more channel line member accounts;
   (c) receiving a reply communication to the first chat communication from a first member application client of said one or more member application clients; and
   (d) sending the reply communication to the non-member application client.

2. The method of claim 1 wherein step (a) comprises creating said chat channel having associated therewith said channel line having associated therewith an automated bot as a channel line member of said channel line.

3. The method of claim 1 further comprising selecting a presentity of the channel line from the group consisting of available, temporary out-of-service, unavailable, busy, hold, and do-not-disturb, so as to determine how the non-member application client and the one or more member application clients access and interact with the channel line.

4. The method of claim 1 wherein step (a) comprises configuring the channel line to have associated therewith a chat communications mode selected from the group consisting of: an intercom chat communications mode, an inbound chat communications mode, and an open chat communications mode.

5. The method of claim 4 wherein configuring the channel line to have associated therewith the chat communications mode comprises selecting the intercom chat communications mode such that a second chat communication between one or more of said one or more member application clients is permitted to have associated therewith a plurality of chat communications media comprising text, voice, video, media clips, and file attachments.

6. The method of claim 4 wherein configuring the channel line to have associated therewith the chat communications mode comprises selecting the inbound communications mode such that the first chat communication is permitted to have associated therewith a plurality of chat communications media comprising text, voice, video, media clips, and file attachments.

7. The method of claim 1 further comprising blocking chat communications addressed to the chat channel line and received from the first application client.

8. The method of claim 1 further comprising sending a second chat communication to the first application client, the second chat communication being selected from the group consisting of: a blast communication, a conference communication, a direct communication and a shout-down communication.

9. The method of claim 1 further comprising transferring the chat session from being associated with the channel line to being associated with a second channel line associated with the chat channel.

10. The method of claim 1 wherein step (b) comprises forwarding the chat communication from the channel line to a second channel line associated with the chat channel and having associated therewith one or more second channel line members, such that the chat communication becomes accessible to application clients associated with the one or more second channel line member accounts without becoming accessible to said application clients associated with the one or more channel line member accounts.

11. The method of claim 1 further comprising adding to the chat session one or more second channel line members associated with a second channel line associated with the chat channel.

12. A messaging system connected to a network, the system comprising:
   (a) a processor;
   (b) a memory in communication with the processor, the memory having stored therein instructions for directing the processor to perform a method of processing chat communications associated with the messaging system, the method comprising:
      (i) in response to user input received from an administrative client, creating a chat channel having associated therewith one or more channel member accounts and a channel line having associated therewith one or more channel line member accounts selected from the one or more channel member accounts, such that a non-member application client not associated with the one or more channel member accounts is permitted to initiate a chat session associated with the one or more channel line member accounts;
      (ii) received, from the non-member application client via the network, a chat communication addressed to the chat channel line so as to initiate the chat session, the chat communication being accessible to one or more member application clients associated with the one or more channel line member accounts;
      (iii) receiving a reply communication to the chat communication from a first member application client of said one or more member application clients; and
      (iv) sending the reply communication to the non-member application client.

13. The messaging system of claim 12 wherein the method further comprises: in response to user input received from one said member application client, closing the chat communication to said one member application client.

14. The messaging system of claim 13 wherein the method further comprises: in response to user input received from said one member application client, resuming the chat communication to said one member application client.

15. The messaging system of claim 12 wherein the method further comprises deleting a chat communications history associated with the chat session.

16. The messaging system of claim 12 wherein the method further comprises restricting access to a specific media content item associated with the chat session.

17. The messaging system of claim 12 wherein the method further comprises: in response to user input received from one said member application client having service control privileges, bridging the chat session to a service access point in a PSTN network.

\* \* \* \* \*